US010402945B2

(12) United States Patent
Mika

(10) Patent No.: US 10,402,945 B2
(45) Date of Patent: Sep. 3, 2019

(54) SYSTEM AND METHOD FOR VIDEO PROCESSING

(71) Applicant: IMINT IMAGE INTELLIGENCE AB, Uppsala (SE)

(72) Inventor: Simon Mika, Uppsala (SE)

(73) Assignee: IMINT IMAGE INTELLIGENCE AB, Uppsala (SE)

(*) Notice: Subject to any disclaimer, the term of this patent is extended or adjusted under 35 U.S.C. 154(b) by 0 days.

(21) Appl. No.: 16/072,079

(22) PCT Filed: Feb. 17, 2017

(86) PCT No.: PCT/EP2017/053687
§ 371 (c)(1),
(2) Date: Jul. 23, 2018

(87) PCT Pub. No.: WO2017/140887
PCT Pub. Date: Aug. 24, 2017

(65) Prior Publication Data
US 2019/0043169 A1    Feb. 7, 2019

Related U.S. Application Data

(63) Continuation of application No. 15/046,907, filed on Feb. 18, 2016, now abandoned, and a continuation of
(Continued)

(51) Int. Cl.
G06T 7/246    (2017.01)
G06T 3/60    (2006.01)
G06T 5/00    (2006.01)

(52) U.S. Cl.
CPC ............... G06T 3/60 (2013.01); G06T 5/003 (2013.01); G06T 7/246 (2017.01);
(Continued)

(58) Field of Classification Search
CPC .......................................... G06T 2207/10016
See application file for complete search history.

(56) References Cited

U.S. PATENT DOCUMENTS 6,549,643 B1* 4/2003 Toklu ................. G06K 9/00751
382/107
7,447,337 B2* 11/2008 Zhang ................. G06K 9/00711
348/699
(Continued)

FOREIGN PATENT DOCUMENTS

GB    2 391 127 A    1/2004
GB    2 401 272 A    11/2004
(Continued)

OTHER PUBLICATIONS

International Search Report (PCT/ISA/210) dated May 24, 2017, by the European Patent Office as the International Searching Authority for International Application No. PCT/EP2017/053687.
(Continued)

Primary Examiner — Paulos M Natnael
(74) Attorney, Agent, or Firm — Buchanan Ingersoll & Rooney P.C.

(57) ABSTRACT

A system, method and computer program for processing at least one video sequence are provided, e.g., for transforming a video sequence to a different format, wherein the at least one video sequence includes a plurality of time-successive image frames. The system is configured to provide a predetermined set of at least one feature, and associate a weighted value to each feature. The system is further configured to provide a predetermined 10 set of at least one imaging process, and to provide a processed video sequence in which the one or more imaging processes have been applied to the video sequence as a function of features detected in the video sequence.

15 Claims, 7 Drawing Sheets

Related U.S. Application Data application No. 15/049,356, filed on Feb. 22, 2016, now abandoned.

(52) U.S. Cl.
CPC ............... *G06T 2207/10016* (2013.01); *G06T 2207/10024* (2013.01); *G06T 2207/20192* (2013.01); *G06T 2207/30201* (2013.01)

(56) References Cited

U.S. PATENT DOCUMENTS

| | | | | |
|---|---|---|---|---|
| 8,723,953 | B2* | 5/2014 | Klomp | H04N 7/18 348/144 |
| 9,996,976 | B2* | 6/2018 | Zhou | G06T 19/006 |
| 2006/0088191 | A1* | 4/2006 | Zhang | G06K 9/00711 382/107 |
| 2006/0187358 | A1* | 8/2006 | Lienhart | G06K 9/00711 348/661 |
| 2010/0103192 | A1 | 4/2010 | Fukumoto et al. | |
| 2011/0043651 | A1 | 2/2011 | Nonaka et al. | |
| 2014/0023348 | A1 | 1/2014 | O'Kelly et al. | |
| 2014/0037269 | A1 | 2/2014 | Kumar et al. | |
| 2014/0081956 | A1 | 3/2014 | Yuki | |
| 2014/0229831 | A1 | 8/2014 | Chordia et al. | |
| 2015/0178953 | A1* | 6/2015 | Gao | G06F 17/2765 345/681 |
| 2017/0039765 | A1* | 2/2017 | Zhou | G06T 19/006 |

FOREIGN PATENT DOCUMENTS

| | | |
|---|---|---|
| WO | 2015/179023 A1 | 11/2015 |
| WO | 2015/191650 A1 | 12/2015 |

OTHER PUBLICATIONS

Written Opinion (PCT/ISA/237) dated May 24, 2017, by the European Patent Office as the International Searching Authority for International Application No. PCT/EP2017/053687.

\* cited by examiner

SYSTEM AND METHOD FOR VIDEO PROCESSING

FIELD OF THE INVENTION

The present invention generally relates to the field of video technology. More specifically, the present invention relates to a system and method for video processing.

BACKGROUND OF THE INVENTION

Videos are abundant in today's society. Due to the rapid technology progress in consumer electronics, many of these videos may be conveniently recorded and/or displayed by handheld devices. It will be appreciated that a majority of today's smartphones are provided with a video recording function, and as the number of smartphone users may be in the vicinity of 3 billion in a few years' time, the market for functions and features related to video recording, especially for devices such as smartphones, is ever-increasing.

However, it should be noted that many recorded videos may be sub-optimal in their presentation. For example, videos may in some cases render features such as objects, persons, patterns, texts, etc., in an inferior way. Consequently, a viewer may have the impression that the video he/she is watching is non-dynamic, uninteresting, or the like, and/or that the video could be presented in a better or more appealing way. The need of improving video presentation may be further substantiated by the observation that many videos may be recorded in a first format and presented in a second format, different to the first format, and that the rendering of the video could be improved. For example, a video may be recorded by a device, e.g. a handheld and/or portable device such as a smartphone, tablet, laptop, etc., and be displayed on a different device, having different features such as a different (screen) format.

Hence, based on the above observations, there may exist a need to process videos such that their presentation may be improved when displayed to a viewer.

SUMMARY OF THE INVENTION

It is an object of the present invention to mitigate the above problems and to provide a system by which a video recording may be processed such that it may be rendered or presented in an improved way compared to the original, unprocessed video recording.

This and other objects are achieved by providing a system, a method and a computer program having the features in the independent claims. Preferred embodiments are defined in the dependent claims.

Hence, according to a first aspect of the present invention, there is provided a system for processing at least one video sequence, wherein the at least one video sequence comprises a plurality of time-successive image frames. The system is configured to provide a predetermined set of at least one feature, and associate a weighted value to each feature. The system is further configured to provide a predetermined set of at least one imaging process, and for at least one image frame of the plurality of time-successive image frames, detect, in the image frame, at least one feature from the predetermined set of at least one feature, define the detected at least one feature by at least one boundary, and provide a frame of weighted density of the image frame, by assigning the weighted value associated with the at least one feature to the area defined by the respective at least one boundary. The system is further configured to superimpose the at least one frame of weighted density into a superimposed set of at least one frame of weighted density. Furthermore, the system is configured to construct at least one combination of at least one of the imaging processes of the set of imaging processes, and for the at least one combination, being configured to, apply the at least one combination to the superimposed set of at least one frame of weighted density, and map the applied at least one combination to a candidate frame, and secondly, associate a value of the candidate frame by evaluating the weighted density of the candidate frame as a function of the applied at least one combination to the superimposed set of at least one frame of weighted density. The system is further configured to select the candidate frame associated with the highest value, and provide, at least one video sequence defined by the selected candidate frame.

According to a second aspect of the present invention, there is provided a method for processing at least one video sequence, wherein the at least one video sequence comprises a plurality of time-successive image frames. The method is configured to provide a predetermined set of at least one feature, and associate a weighted value to each feature. The method is further configured to provide a predetermined set of at least one imaging process, and for at least one image frame of the plurality of time-successive image frames, perform the following steps: detecting, in the image frame, at least one feature from the predetermined set of at least one feature, defining the detected at least one feature by at least one boundary, and providing a frame of weighted density of the image frame, by assigning the weighted value associated with the at least one feature to the area defined by the respective at least one boundary. The method further comprises the steps of superimposing the at least one frame of weighted density into a superimposed set of at least one frame of weighted density, and constructing at least one combination of at least one of the imaging processes of the set of imaging processes. For the at least one combination, the method further comprises the steps of applying the at least one combination to the superimposed set of at least one frame of weighted density, and mapping the applied at least one combination to a candidate frame, and associating a value of the candidate frame by evaluating the weighted density of the candidate frame as a function of the applied at least one combination to the superimposed set of at least one frame of weighted density. The method further comprises the steps of selecting the candidate frame associated with the highest value, and providing at least one video sequence defined by the selected candidate frame.

According to a third aspect of the present invention, there is provided a computer program comprising computer readable code for causing a computer to carry out the steps of the method according to the second aspect of the present invention when the computer program is carried out on the computer.

Thus, the present invention is based on the idea of processing a video sequence, whereby features of particular interest may be emphasized in the resulting video sequence by applying one or more imaging processes. Each of these features of particular interest, which may be detected by the system in the video sequence, may have a weighted value associated with it, and the system may hereby provide frame(s) of weighted density as a function of the weighted value and the area of the boundary defining the feature(s). Furthermore, as the system is configured to merge the frames into an overlapping, superimposed set of frames of weighted density, one or more imaging processes may be applied to the set and mapped to a candidate frame, and a value is associated of each candidate frame by evaluating the weighted density of the candidate frame as a function of the applied at least one combination to the superimposed set of at least one frame of weighted density. Then, a resulting video sequence may be rendered as the candidate frame associated with the highest value. Hence, the resulting video sequence is rendered (presented) as a function of features and imaging processes for e.g. emphasizing, following and/or focusing on features in the video sequence of particular interest.

The present invention is advantageous in that the system may provide a video sequence which may be more appealing and/or interesting for a viewer compared to an original, unprocessed video sequence. This is based on the observation that features of particular interest may have a more dominant appearance in the processed video sequence.

The present invention is further advantageous in that the system may provide an automatic processing of video sequences. Hence, as the system may apply one or more imaging processes automatically to the video sequence, a user may not need to manually process the video sequence for providing a (more) appealing video sequence.

The present invention is further advantageous in that a video sequence may be conveniently transferred to a different format, whereby features of particular interest may be emphasized in the new format.

According to the first aspect of the present invention, a system is provided for processing at least one video sequence, wherein the at least one video sequence comprises a plurality of time-successive image frames. The system is configured to provide a predetermined set of at least one feature, and associate a weighted value to each feature. By the term "feature", it is here meant a characteristic feature in a time-successive image frame object, such as a human being, a face of a human being, a color, text. By the term "predetermined set", it is here meant a list of features set in advance. By the term "weighted value", it is here meant a value which is set as a function of the feature to which it is associated.

The system is further configured to provide a predetermined set of at least one imaging process. Here, in this context, the term "predetermined set" means a list of imaging processes set in advance. Furthermore, by the term "imaging process", it is here meant substantially any process for the processing of images.

For at least one image frame of the plurality of time-successive image frames, the system is further configured to detect, in the image frame, at least one feature from the predetermined set of at least one feature. By the term "detect", it is here meant that the system is configured to recognize, identify, or the like, a feature. The system is further configured to define the detected at least one feature by at least one boundary. By the term "boundary", it is here meant a frame, or the like, provided around the feature. The system is further configured to provide a frame of weighted density of the image frame, by assigning the weighted value associated with the at least one feature to the area defined by the respective at least one boundary. In other words, the frame of weighted density may comprise a relatively high (low) density if a relatively high (low) weighted value of a feature is associated with a feature defined by a relatively small (large) area.

The system is further configured to superimpose the at least one frame of weighted density into a superimposed set of at least one frame of weighted density. By the term "superimpose", it is here meant that the system is configured to arrange the frame(s) of weighted density on top of each other (in an overlapping manner) or, in other words, to merge the frame(s) into a merged set of at least one frame of weighted density.

Furthermore, the system is configured to construct at least one combination of at least one of the imaging processes of the set of imaging processes. In other words, one or more imaging process may be combined into a set of imaging processes to be applied to the video sequence. For this combination, the system is configured to perform the following: firstly, by applying the at least one combination to the superimposed set of at least one frame of weighted density and mapping the applied at least one combination, a candidate frame is constructed. In other words, one or more candidate frames are constructed by the system by applying the combination(s) to the superimposed set of frame(s) of weighted density and mapping the applied combination(s) to the candidate frame(s). Secondly, the system is configured to associate a value of the candidate frame by evaluating the weighted density of the candidate frame as a function of the applied at least one combination to the superimposed set of at least one frame of weighted density. In other words, the system is configured to evaluate, calculate and/or integrate the weighted density of the candidate frame as a function of the combination(s) applied to the superimposed set of frame(s) of weighted density, to thereby obtain a value. This value is thereafter associated or assigned to the candidate frame by the system.

The system is further configured to select the candidate frame associated with the highest value. In other words, the system is configured to select the candidate frame which according to the evaluation, calculation and/or integration of the weighted density of the candidate frame as a function of the combination(s) applied to the superimposed set of frame(s) of weighted density, yields the highest value.

Furthermore, the system is configured to provide at least one video sequence defined by the selected candidate frame. In other words, the system is configured to render or present the video sequence(s) defined by the candidate frame of highest value, e.g. on a screen having the same format (i.e. width and height) as the candidate frame.

According to an embodiment of the present invention, the feature is selected from a group consisting of an object, a human being, a face of a human being, a color and a text. In other words, there may be provided a predetermined set of features comprising an object, a human being, a face of a human being, a color and/or a text. The present embodiment is advantageous in that the system may conveniently and efficiently detect one or more of the predetermined features in the video sequence(s). Furthermore, it will be appreciated that the mentioned features may be those which may be of particular interest to a user or viewer to see in a resulting video.

According to an embodiment of the present invention, the system is further configured to associate a weighted value to each feature according to a predetermined set of weighted values. In other words, a specific weighted value is associated (assigned) to a specific feature, leading to a hierarchic set or list of features wherein features of relatively high interest are associated to a relatively high value, and features of a relatively lower interest are associated to a relatively lower value. The present embodiment is advantageous in that system may hereby be able to easily and conveniently identify the (most) interesting features in a video sequence when rendering a resulting video sequence by e.g. emphasizing, following and/or focusing on features of particular interest.

According to an embodiment of the present invention, the system is further configured to detect a motion of at least one detected feature based on at least two image frames of the plurality of time-successive image frames, and associate a weighted value to the at least one feature as a function of the motion of the at least one feature. In other words, the system may be configured to track the detected feature(s). By the term "track", it is here meant that the system is configured to follow any movement of the feature. Hence, the system may identify a motion or movement of a feature, and associate a value of the motion of the feature, e.g. dependent on the feature's velocity. The present embodiment is advantageous in that a feature in motion in the video sequence may emphasized, followed and/or focused on in the rendered resulting video sequence.

According to an embodiment of the present invention, the imaging process is selected from a group consisting of adjusting at least one of the height and the width of the video sequence to the respective one of the height and the width of the candidate frame, providing the union of the video sequence for processing with the candidate frame of a second format, and zooming the video sequence for processing. In other words, in the firstly exemplified imaging process, either the height or the width of the video sequence is adapted (adjusted, mapped and/or fitted) to the respective height or width of the video sequence for processing. This imaging process of adjusting at least one of the height and the width of the video sequence to the respective one of the height and the width of the candidate frame of a second format may be referred to as "padding". Furthermore, the "padding" in the present embodiment implies that the union of the video sequence for processing and the candidate frame may provide at least one area of the resulting (processed) video sequence defined by the selected candidate frame which does not comprise any material of the (unprocessed) video sequence. This area or areas may, for example, be provided with a pattern, or the like, in the resulting video sequence. Furthermore, in the secondly exemplified imaging process, the provision of the union (i.e. the superimposed overlap) of the video sequence with the candidate frame, may be referred to as "cropping". Furthermore, in the thirdly exemplified imaging process, the zooming of the video sequence may comprise either an in-zooming or an out-zooming of the video sequence. The present embodiment is advantageous in that the system may apply any one, or a combination of, the exemplified imaging processes for e.g. emphasizing, following and/or focusing on features of particular interest to be presented in the resulting video sequence.

According to an embodiment of the present invention, the system is configured to detect, in the image frame, at least one feature from the predetermined set of at least one feature based on pattern recognition. The present embodiment is advantageous in that pattern recognition is highly efficient regarding the detection of one or more features in images and/or videos. It will be appreciated that pattern recognition, being a branch of machine learning that focuses on the recognition of patterns and regularities in data, is known to the skilled person, and the details thereof is omitted.

According to an embodiment of the present invention, the system is configured to process at least one video sequence in a first format, wherein the system is further configured to provide at least one video sequence in a second format, defined by the selected candidate frame, and wherein the first format is different from the second format. In other words, the unprocessed at least one video sequence may have a first format, and the processed at least one video sequence may have a second format, different from the first format. By the term "first format", it is here meant a format of the video sequence in two dimensions, i.e. having a height and width. The present embodiment is advantageous in that the system may be configured to transform (map) a video sequence of a first format into a video sequence of a second format, wherein the latter may be more convenient to display to a user, leading to an improved visualization experience for the user. The present embodiment is further advantageous when considering that numerous video sequences may be recorded by a first device, e.g. a handheld and/or portable device such as a smartphone, tablet, laptop, etc., but intended to be displayed on a second device, having a different configuration and/or features compared to the first device, such as a different (screen) format.

According to an embodiment of the present invention, the width of the first format is larger than the height of the first format, and wherein the height of the second format is larger than the width of the second format. For example, the at least one video sequence of the first format may have a rectangular (horizontal) format, e.g. fitted to a screen of a handheld device when held horizontally, whereas the at least one video sequence of the second format may have a rectangular (vertical) format, e.g. fitted to a screen of a handheld device when held vertically. It will be appreciated that devices for video recording and/or display are usually provided with a rectangular screen, and there may be a wish to conveniently render a video sequence recorded "vertically" into a "horizontal" video sequence, or vice versa. More specifically, devices such as smartphones and or tablets are often designed to be operated and/or used in a vertical (standing, upright) position, whereby the screen commonly has a larger height than width, and video sequences are often recorded and/or displayed in this vertical format. Hence, the present embodiment is advantageous in that the system may conveniently transform a video sequence from a horizontal to vertical format. Recent studies show that many viewers (users) avoid rotating their (handheld) devices when consuming video sequences such as commercials, news clips, etc., and that video sequences therefore are often in a vertical format on such devices. By the present embodiment, however, the user may not need to turn the handheld device, e.g. from a vertical to a horizontal position, when the video sequence is displayed in the handheld device.

According to an embodiment of the present invention, there is provided a device for video recording. The device comprises a screen and a system according to any one of the preceding embodiments. The device is configured to display, on the screen, at least one video sequence processed by the system. In this embodiment, the system may be configured to process (a) video sequence(s) which has (have) been provided to the device for video recording (e.g. from a server) or (a) video sequence(s) which has (have) been recorded by the device itself.

According to an embodiment of the present invention, the device is further configured to record at least one video sequence, and to provide the at least one video sequence to the system for processing of the at least one video sequence. Furthermore, the device is further configured to display, on the screen, the at least one video sequence processed by the system. Hence, in the present embodiment, the system may be configured to process one or more video sequences which have been recorded by the device.

According to an embodiment of the present invention, the device is further configured to record and display the at least one video sequence in real time. In other words, the device may be configured to record on or more video sequences, process the video sequence(s) by the system according to any one of the previous embodiments, and, simultaneously (or at least almost simultaneously) display the video sequence(s) processed by the system.

According to an embodiment of the present invention, the device further comprises a storage medium. The device is further configured to store, on the storage medium, the at least one video sequence processed by the system, and the combination of at least one of the imaging processes of the set of imaging processes applied to the constructed candidate frame associated with the highest value, defining the at least one video sequence. In other words, the device may be configured to store a plurality of video sequences together with the combination of imaging processes which resulted in the respective video sequence. The present embodiment is advantageous in that the video sequences and the combination of imaging processes associated therewith may be used as feedback to the system, such that the system may be improved with the purpose of even further improving the resulting video sequences.

According to an embodiment of the present invention, the device further comprises a user interface, UI, configured to be used in conjunction with the screen. The UI is configured to register at least one marking by a user of at least one feature on the screen during a display of at least one video sequence on the screen, whereby the UI is provided with user input. The system is further configured to associate the at least one marking with at least one feature of the predetermined set of at least one feature, and define the at least one feature by at least one boundary. It will be appreciated that the UI may be a touch-sensitive user interface. By the term "touch-sensitive user interface", it is here meant a UI which is able to receive an input by a user's touch, such as by one or more fingers of a user touching the UI. The present embodiment is advantageous in that a user, in an easy and convenient manner, may mark, indicate and/or select one or more features in the video sequence(s) by touch, e.g. by the use of one or more fingers. Alternatively, the marking by a user of at least one feature may be made as a function of eye-tracking of the user. Alternatively, the marking by a user of at least one feature may be made by speech of the user. As both techniques of eye-tracking and speech are known to the person skilled in the art, more detailed descriptions thereof are omitted.

It will be appreciated that the mentioned advantages of the system of the first aspect of the present invention also hold for the method according to the second aspect of the present invention and the computer program according to the third aspect of the present invention.

Further objectives of, features of, and advantages with, the present invention will become apparent when studying the following detailed disclosure, the drawings and the appended claims. Those skilled in the art will realize that different features of the present invention can be combined to create embodiments other than those described in the following.

BRIEF DESCRIPTION OF THE DRAWINGS

This and other aspects of the present invention will now be described in more detail, with reference to the appended drawings showing embodiment(s) of the invention.

DETAILED DESCRIPTION

Figure 1:
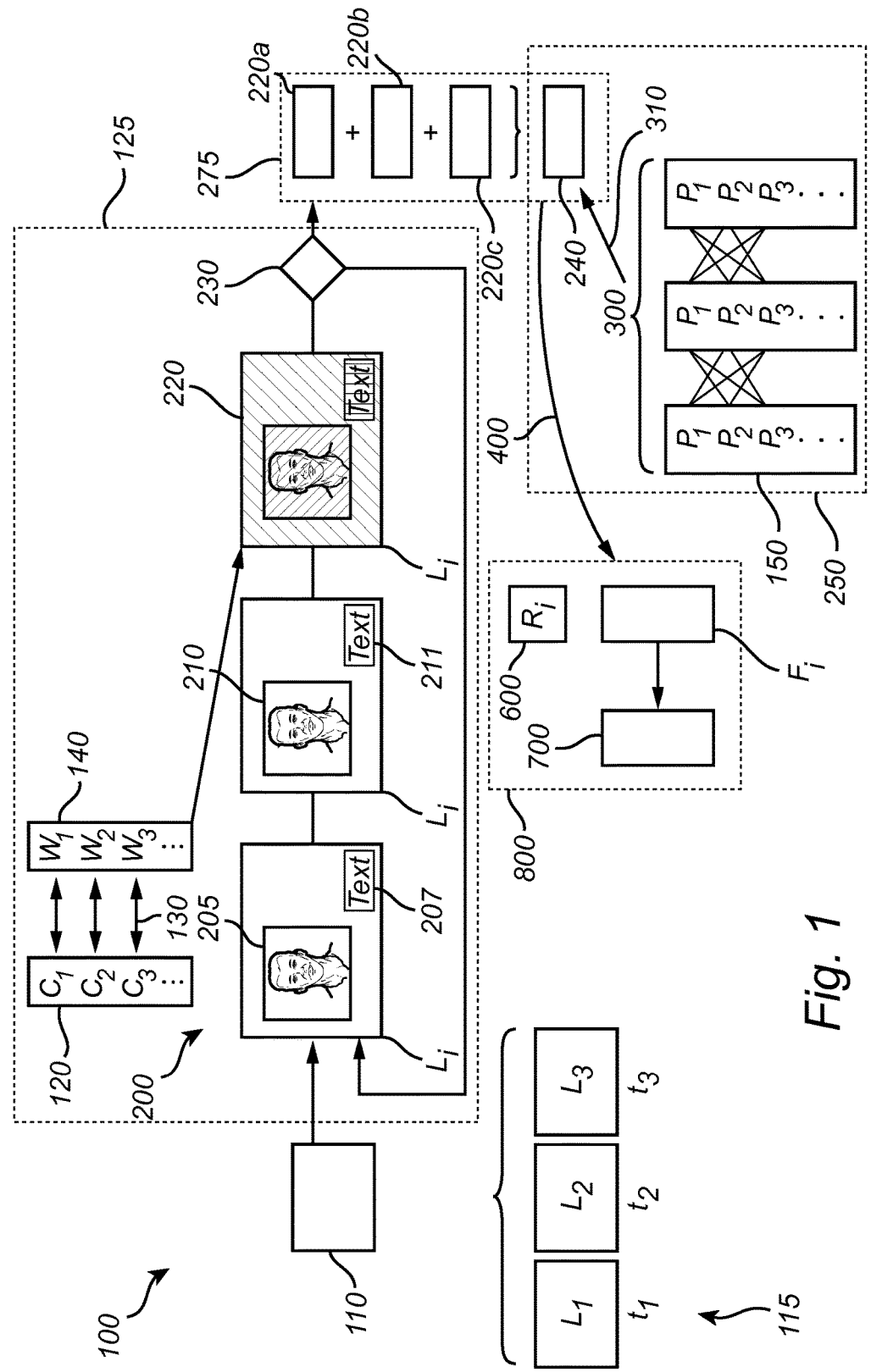
FIG. 1 is a schematic view of a system according to an exemplifying embodiment of the present invention.

FIG. 1 is a schematic view of a system 100 for processing a video sequence 110, wherein the video sequence 110 comprises a plurality of time-successive image frames 115. The video sequence 110 may, for example, be a film, a scene in a film, a commercial, a (news) clip, etc. Here, the time-successive image frames 115 are exemplified as image frames $L_i$ ($L_1$, $L_2$, $L_3$) etc., wherein i is an integer, at respective times $t_1$, $t_2$, $t_3$, etc., respectively. The system 100 is configured to provide a predetermined set 120 of at least one feature $C_i$ ($C_1$, $C_2$, $C_3$, etc.). It will be appreciated that the (characteristic) feature $C_i$ may be substantially any feature, and examples of features $C_i$ may be one or more objects, human beings, faces of human beings, colors, texts, etc. The system 100 is further configured to associate 130 a weighted value $W_i$ to each feature $C_i$. For example, there may be a predetermined set 140 of weighted values $W_i$ ($W_1$, $W_2$, $W_3$, etc.), wherein a specific weighted value $W_i$ may be associated with (linked to) a specific feature $C_i$.

Turning to dashed frame 125, the system 100 is further configured to, for at least one image frame $L_i$ of the time-successive image frames 115, perform the following: detect 200, in the image frame $L_i$, one or more features $C_i$ from the predetermined set 120 of at least one feature $C_i$. Hence, the system 100 may detect 200 (recognize) one or more features in the respective image frame (e.g. based on pattern recognition), and associate the feature(s) with a respective feature $C_i$ of the predetermined set 120 of features $C_i$. In FIG. 1, as an example, the system 100 has detected 200 a face 205 and a text 207 in the indicated positions in the image frame $L_i$.

The system 100 is further configured to define the detected 200 at least one feature $C_i$ by at least one boundary 210, 211. Here, the feature $C_1$ (face 205) is defined by a rectangular boundary 210, and the feature $C_2$ (text 207) is defined by a rectangular boundary 211. However, it will be appreciated that the boundary or boundaries alternatively may be e.g. elliptic, circular, etc. The system 100 is further configured to provide a frame of weighted density 220 of the image frame $L_i$ by assigning the weighted value $W_i$ associated with the at least one feature $C_i$ to the area $A_i$ defined by the respective at least one boundary 210, 211. The area $A_i$ may, for example, be defined by its number of pixels. For example, and as indicated in FIG. 1, the system 100 may be configured to assign the weighted value $W_1$ associated with $C_1$ (face 205) as feature to the area $A_1$ defined by the boundary 210 of the face 205. Analogously, the system 100 may be configured to assign the weighted value $W_2$ associated with $C_2$ (text 207) as feature to the area $A_2$ defined by the boundary 211 of the text 207. The system 100 may hereby be configured to provide a frame of weighted density 220 by evaluating the ratio $W_i/A_i$ for each feature and boundary wherein i is an integer. Consequently, the frame of weighted density 220 may comprise a relatively high density $W_i/A_i$ in specific areas of the image frame $L_i$ if a relatively high weighted value $W_i$ of a feature $C_i$ is associated with a boundary of the feature $C_i$ having a relatively small area $A_i$.

The system 100 may be configured to iteratively detect 200 feature(s) $C_i$, define the feature(s) $C_i$ by (a) boundary/ boundaries 210 and provide frames of weighted density 220 for at least one, and possibly all, image frames 115, as indicated by symbol 230.

Turning to dashed frame 275, the number of frames of weighted density 220a-c are exemplified as three frames 220a-c, and it will be appreciated that the number has been chosen merely as an example. When all, or at least one, of the image frames 115 have been processed by these steps of the system 100, the system 100 is further configured to superimpose the frame(s) of weighted density 220a-c into a superimposed set 240 of at least one frame of weighted density. In other words, the system 100 is configured to arrange the frames of weighted density 220a-c on top of each other (or, in other words, to merge the frames 220a-c) into a superimposed (merged) set 240 of at least one frame of weighted density.

Turning to dashed frame 250, the system 100 is further configured to provide a predetermined set 150 of at least one imaging process $P_i$ ($P_1$, $P_2$, $P_3$, etc.). It will be appreciated that the imaging process $P_i$ may be substantially any imaging process. For example, the imaging process $P_i$ may imply adjusting the height and/or the width of the video sequence 110, removing one or more portions of the video sequence 110 for processing, zooming in the video sequence 110 for processing, etc. Furthermore, the system 100 is configured to construct at least one combination 300 of at least one of the imaging processes $P_i$ of the predetermined set 150 of imaging processes. In FIG. 1, there is disclosed an example of three predetermined sets 150, each having imaging processes $P_i$. For example, a combination 300 may constitute $P_1$; $P_1$, $P_2$; $P_1$, $P_2$, $P_3$, or $P_2$, $P_1$, $P_3$, etc. The system 100 is configured to apply 310 the combination 300 to the superimposed set 240 of at least one frame of weighted density. Then, the system 100 is configured to map 400 the applied at least one combination to a candidate frame $F_i$. Here, one or more candidate frames $F_i$ are constructed by the system 100 by applying the combination(s) 300 to the superimposed set 240 of frame(s) of weighted density and mapping the applied combination(s) 300 to the candidate frame(s) $F_i$. The candidate frame $F_i$ may be in the same format as $L_i$. Alternatively, the candidate frame $F_i$ may have another format than $L_i$.

Turning to dashed box 800, the system 100 is configured to associate 600 a value $R_i$ of the candidate frame $F_i$ by evaluating the weighted density of the candidate frame as a function of the applied at least one combination 300 to the superimposed set 240 of at least one frame of weighted density. The system 100 is further configured to select the candidate frame $F_i$ associated with the highest value and configured to provide at least one video sequence 700 defined by the selected candidate frame $F_i$. In other words, the system 100 is configured to render the video sequence(s) 700 defined by the candidate frame $F_i$ of highest value $R_i$. The video sequence(s) 700 may be displayed on a screen (e.g. of a mobile device such as a smartphone), wherein the candidate frame $F_i$ and the screen have the format, i.e. the same width and height.

Hence, FIG. 1 schematically illustrates the processing of a video sequence, whereby features of particular interest may be emphasized in the resulting video sequence by applying one or more imaging processes. The purpose of the following FIGS. 2-5 is to more closely explain and exemplify the steps of the processing of a video sequence presented in FIG. 1.

Figure 2:
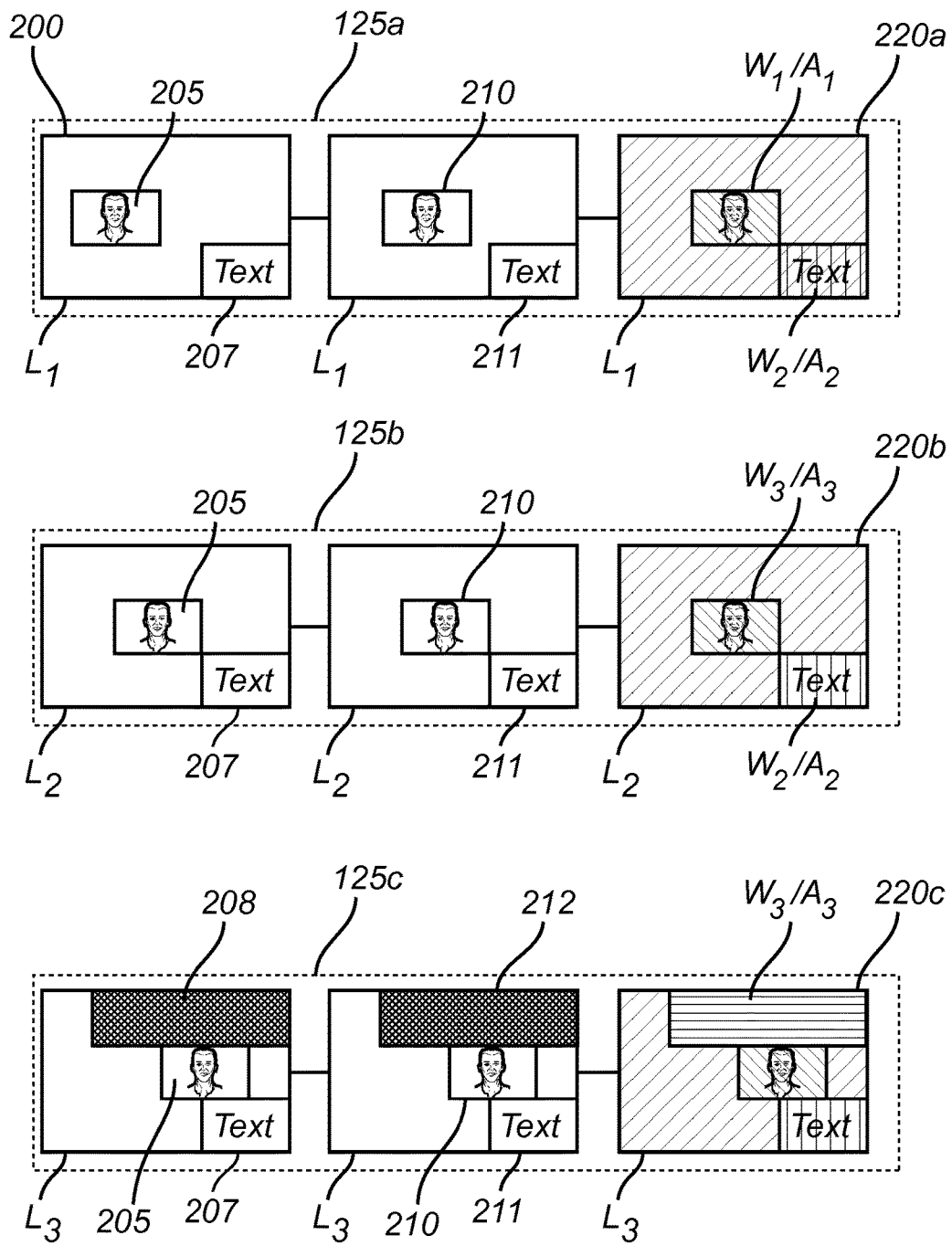
FIGS. 2-5 are schematic views of portions of the system.

FIG. 2 is a schematic view of a portion of the system 100 indicated by the dashed box 125 in FIG. 1, wherein three dashed boxes 125a-c are disclosed for an increased understanding of the performed steps of the system 100. The dashed box 125a in FIG. 2 is analogue with the dashed box 125 in FIG. 1. Here, the system 100 is configured to detect 200, in the image frame $L_1$ of the time-successive image frames 115 of the video sequence 110, one or more features $C_i$ from the predetermined set 120 of at least one feature $C_i$. As an example, the system 100 has in dashed box 125a detected 200 (recognized) a face 205 at a left hand side portion of the image frame $L_1$ (e.g. based on pattern recognition), and is configured to associate the face 205 with the respective feature $C_i$ e.g. $C_1$, of the predetermined set 120 of features $C_i$. Furthermore, the system 100 has detected 200 a text 207 at a lower right hand side portion of the image frame $L_1$, and associates the text 207 with the respective feature, e.g. $C_2$, of the predetermined set 120 of features $C_i$. The system 100 is further configured to define the detected 200 at least one feature $C_i$ by at least one boundary 210, 211. Here, the feature $C_1$ (face 205) is defined by a rectangular boundary 210, and the feature $C_2$ (text 207) is defined by a rectangular boundary 211.

The system 100 is further configured to provide a frame of weighted density 220a of the image frame, by assigning the weighted value $W_i$ associated with the at least one feature $C_i$ to the area $A_i$ defined by the respective at least one boundary. In this example, the system 100 may be configured to assign the weighted value $W_1$ associated with $C_1$ (face 205) as feature to the area $A_1$ defined by the boundary 210 of the face 205. Analogously, the system 100 may be configured to assign the weighted value $W_2$ associated with $C_2$ (text 207) as feature to the area $A_2$ defined by the boundary 211 of the text 207. The system 100 may hereby be configured to provide a frame of weighted density 220a by evaluating the ratio $W_1/A_1$ for the face 205 having weight $W_1$ defined by boundary 210 of area $A_1$, and by evaluating the ratio $W_2/A_2$ for the text 207 having weight $W_2$ defined by boundary 211 of area $A_2$.

In dashed box 125b, the system 100 is configured to analyze the image frame $L_2$, i.e. the image frame in succession of $L_1$. In $L_2$, the system 100 has detected 200 the face 205 of image frame $L_1$ at a relatively central portion of the image frame $L_2$, whereas the system 100 has detected 200 the text 207 at a lower right hand side portion of the image frame $L_2$, similarly with the position of the text 207 as detected in $L_1$. Analogously with the steps of dashed box 125a, the system 100 is configured to provide a frame 220b by evaluating the ratio $W_1/A_1$ for the face 205 having weight $W_1$ defined by boundary 210 of area $A_1$, and by evaluating the ratio $W_2/A_2$ for the text 207 having weight $W_2$ defined by boundary 211 of area $A_2$.

In dashed box 125c, the system 100 is configured to analyze the image frame $L_3$, i.e. the image frame in succession of $L_2$. In $L_3$, the system 100 has detected 200 the face 205 of image frame $L_1$ at a right hand side portion of the image frame $L_3$, whereas the system 100 has detected 200 the text 207 at a lower right hand side portion of the image frame $L_3$, similarly with the position of the text 207 as detected in $L_1$ and $L_2$. Furthermore, the system 100 is configured to detect 200 a color 208 at an upper, left hand side portion of the image frame $L_3$, and associates the color 208 with the respective feature, e.g. $C_3$, of the predetermined set 120 of features $C_i$. The system 100 is further configured to define the detected 200 feature $C_3$ (color 208) by a rectangular boundary 212.

Analogously with the steps of dashed box 125a-b, the system 100 is configured to provide a frame 220c by evaluating the ratio $W_1/A_1$, $W_2/A_2$ and $W_3/A_3$, wherein the latter ratio indicates the weight $W_3$ defined by boundary 212 of area $A_3$ associated with the detected color 208.

Furthermore, the system 100 may be configured to detect a motion of at least one detected feature $C_i$ based on at least two image frames $L_i$ of the plurality of time-successive image frames L, and associate a weighted value $W_i$ to the at least one feature $C_i$ as a function of the motion of the at least one feature $C_i$. For example, the system 100 may be configured to track the movement of the face 205 detected in image frames $L_1$, $L_2$ and $L_3$. In other words, the system 100 may be configured to track the movement of the face 205 in the video sequence 110, wherein the detected 200 face 205 moves from left to right in the image frames $L_1$, $L_2$ and $L_3$. The associated weighted value $W_1$ to the feature $C_1$ may, for example, be set as a function of the velocity of the face 205 in the video sequence 110, based on at least two of the image frames $L_1$, $L_2$ and $L_3$ at respective times $t_1$, $t_2$ and $t_3$. For example, the system 100 may be configured to assign a higher weighted value $W_i$ to a detected feature $C_i$, when the system 100 detects a relatively high velocity (or alternatively, a relatively slow velocity) of the feature $C_i$.

Figure 3:
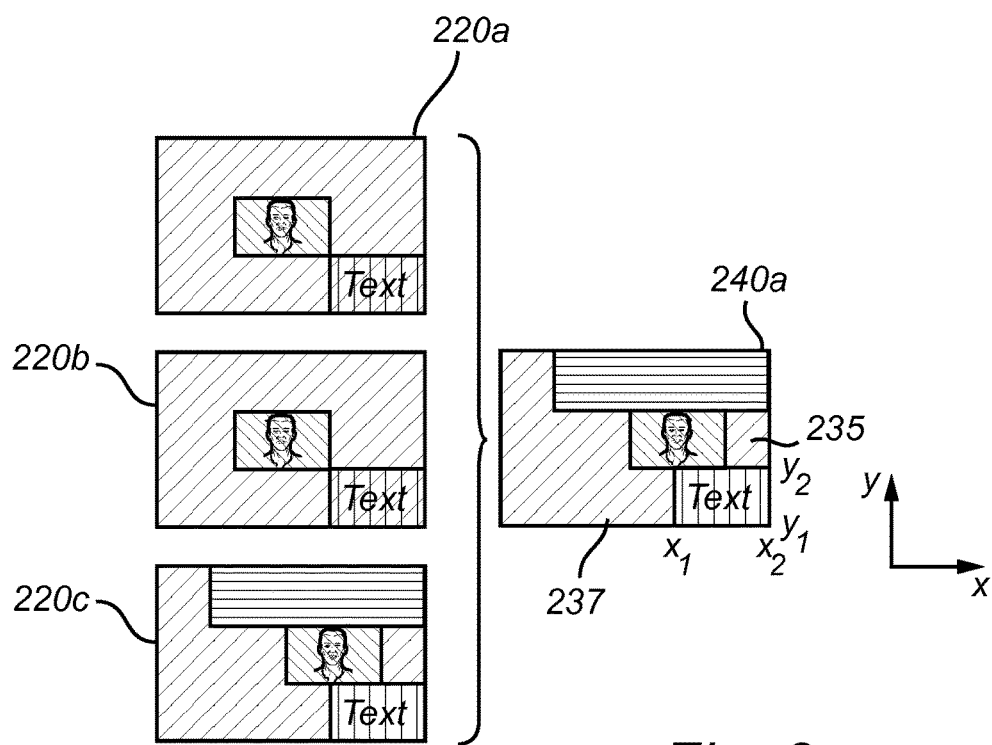
Figure 4:
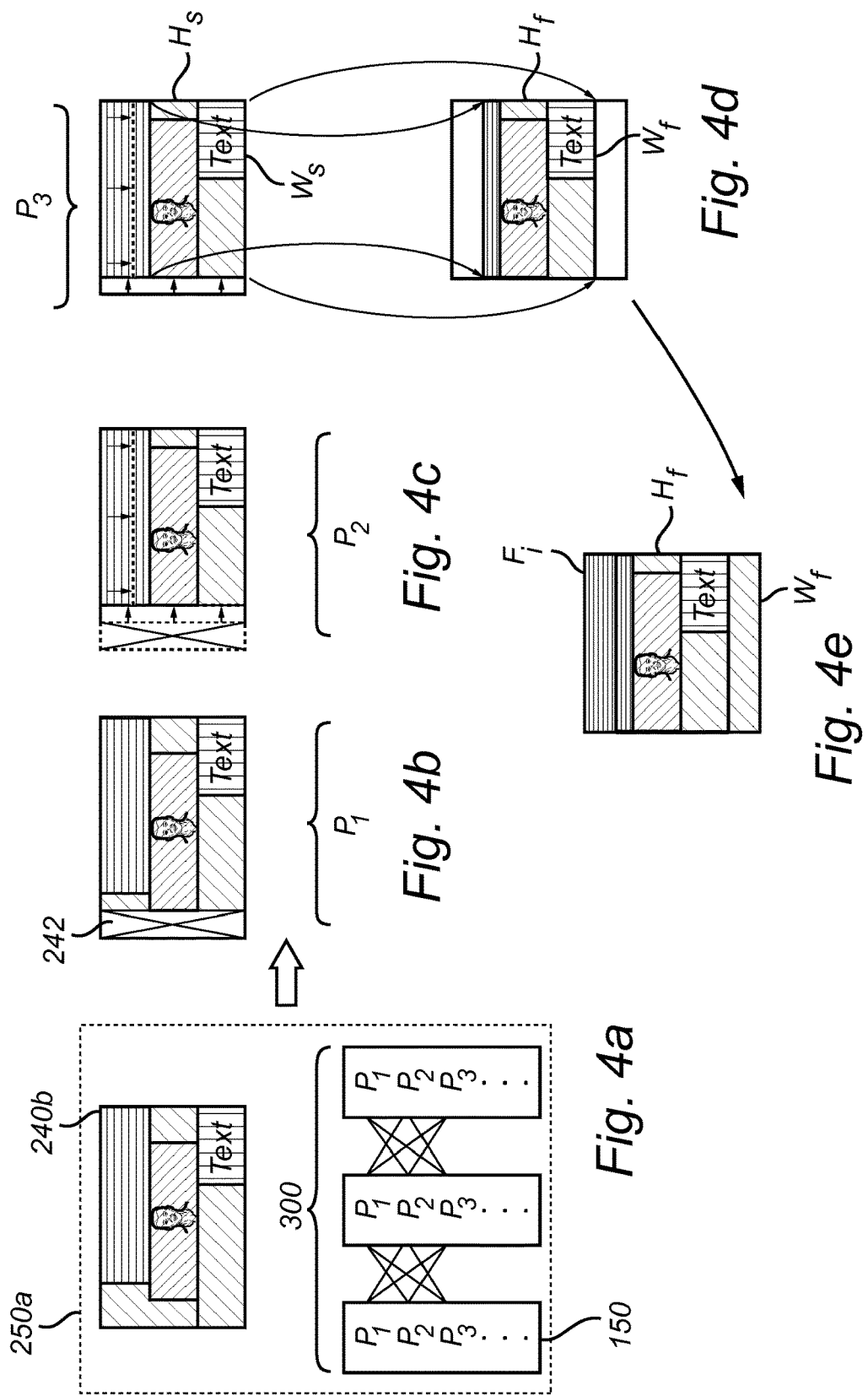

FIG. 3 is a schematic view of a portion of the system 100 indicated by the dashed box 275 in FIG. 1 for an increased understanding of the performed steps of the system 100. Here, the frames of weighted density 220a-c as exemplified in FIG. 2 are superimposed (overlapped, merged) by the system 100, leading to a superimposed set 240a of the frames 220a-c of weighted density. In other words, the system 100 is configured to arrange the frames of weighted density 220a-c on top of each other (or, in other words, to merge the frames 220a-c) into a superimposed (merged) set 240a of the three frames of weighted density 220a-c. Notably, in the superimposed set 240a, the detected motion of the face 205 in the image frames $L_1$-$L_3$ constitutes a central portion, whereas the detected text 207, detected by the system 100 to be stationary in the image frames $L_1$-$L_3$, constitutes a lower, right hand side thereof. The detected color 208, present only in $L_3$ of the image frames $L_1$-$L_3$ constitutes an upper, right hand side portion of the superimposed set 240a. Hence, the superimposed set 240a represents a density frame or chart of features $C_i$ as a function of time and area. The superimposed set 240a may be described as the sum of all frames 220a-c of weighted density, wherein for each frame 220a-c in time, there is provided a density as a function of the weighted value $W_i$ associated to the detected feature $C_i$ defined by a boundary between coordinates $x_{i1}$-$x_{i2}$ and $y_{i1}$-$y_{i2}$ defining area $A_i = (x_{i2}-x_{i1}) \cdot (y_{i2}-y_{i1})$. For example, the density of the superimposed set 240a in a region $x_{i2}-x_{i1}$; $x_{i2}-x_{i1}$ of a boundary of a detected feature $C_i$ having weighted value $W_i$ may be expressed as $\text{sum}(i,t)\ [i \cdot W_{i,t}(C_{i,t})/[(x_{i,t:2}-x_{i,t:1}) \cdot (y_{i,t:2}-y_{i,t:1})]]$. For example, the density of the superimposed set 240a in the lower right hand side region $x_2$-$x_1$ and $y_2$-$y_1$ of the boundary 211 of the detected text 207, may be expressed as $3 \cdot W_2(C_2)/[(x_{i2}-x_{i1}) \cdot (y_{i2}-y_{i1})]$. It will be appreciated that, in case the weighted value $W_2$ associated with the detected text $C_2$ is relatively high, and/or if the area $A_2$ defined by the boundary 211 associated with the text $C_2$ is relatively small, the density of the superimposed set 240a where the text 207 is detected may be relatively high. Furthermore, in areas of the superimposed set 240a where no feature $C_i$ has been detected, as exemplified by the lower left and upper left hand side region 237 and the mid right hand side region 235 in the superimposed set 240a, the system 100 may be configured to set the density to zero.

FIG. 4a is a schematic view of a portion of the system 100 indicated by the dashed box 250 in FIG. 1 for an increased understanding of the performed steps of the system 100. The system 100 is configured to construct a combination 300 of at least one of the imaging processes $P_i$ of the predetermined set 150 of imaging processes. As an example, the system 100 may be configured to construct the combination $P_1$, $P_2$, $P_3$, wherein $P_1$ may indicate a removal (omission) of at least a portion of the superimposed set 240b, $P_2$ may indicate a zooming of at least a portion of the superimposed set 240b, and $P_3$ may indicate adjusting at least one of the height and the width of the superimposed set 240b to the respective one of the height and the width of a candidate frame.

In FIG. 4b, the system 100 may firstly be configured to apply imaging process $P_1$ to the superimposed set 240b. The system 100 may hereby be configured to remove (omit) the leftmost portion 242 of the superimposed set 240b, as its density is zero.

In FIG. 4c, the system 100 may thereafter be configured to apply imaging process $P_2$ to the resulting superimposed set 240b after being processed by $P_1$. The system 100 may hereby zoom in, in the x- and y-direction, on the portion of the superimposed set 240b in the lower, right hand side corner.

In FIG. 4d, the system 100 may thereafter be configured to apply imaging process $P_3$ to the resulting superimposed set 240b after being processed by $P_1$ and $P_2$. The system 100 may hereby adjust the width $W_s$ of the superimposed set 240b to a width $W_f$, which may correspond to the width of a candidate frame. Analogously, the system 100 may be configured to scale the height $H_s$ of the superimposed set 240b to the height $H_f$ such that the symmetry of the superimposed set 240b is conserved.

In FIG. 4e, the system 100 is configured to map the applied combination of the imaging processes $P_1$, $P_2$, $P_3$ to the superimposed set 240b to a candidate frame 260. Here, the candidate frame $F_i$ has a width $W_f$, i.e. equal to the width of the superimposed set 240b of FIG. 4d, and a height which is larger than the height $H_f$ of the superimposed set 240b of FIG. 4d. Here, the system 100 may be configured to center the processed superimposed set 240b in the candidate frame $F_i$. The off-center (i.e. empty) portions of the candidate frame $F_i$ may be filled with padded values which thereby may provide a more appealing result. This is exemplified in FIG. 4e, wherein the lower portion of the candidate frame $F_i$ comprises the same pattern as the adjacent portion, to the left of the text (indicated by diagonal lines). Analogously, the pattern of the upper portion in FIG. 4e (exemplified by horizontal lines) is the same as the adjacently provided portion above the face. Hence, if the candidate frame $F_i$ is displayed on a screen, the upper and lower portions of the screen may be filled (padded) with a pattern.

Figure 5:
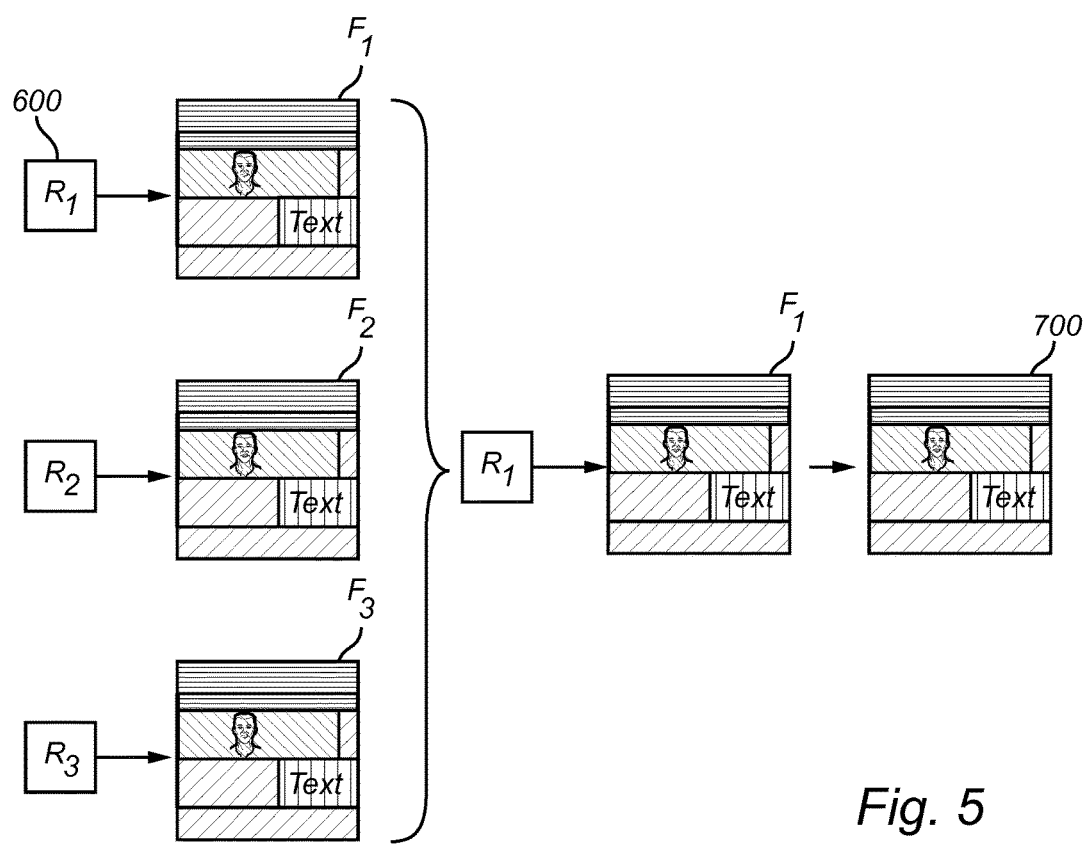

FIG. 5 is a schematic view of a portion of the system 100 indicated by the dashed box 800 in FIG. 1 for an increased understanding of the performed steps of the system 100. The system 100 is configured to map the applied combination(s) 300 of imaging processes $P_i$, to the superimposed set 240b of FIG. 4d, to one or more candidate frames $F_i$. Here, the system 100 has been configured to provide three candidate frames $F_1$, $F_2$, and $F_3$. Moreover, the system 100 is configured to associate 600 a value $R_i$ of the candidate frame $F_i$ by evaluating (e.g. by integration and/or addition) the weighted density of the candidate frame $F_i$ as a function of the applied at least one combination 300 of imaging processes $P_i$ to the superimposed set 240 of at least one frame of weighted density. As exemplified in FIG. 5, the system 100 is configured to associate a value $R_i$ to candidate frame $F_1$, $R_2$ to candidate frame $F_2$, and $R_3$ to candidate frame $F_3$. The system 100 is further configured to select the candidate frame $F_i$ associated with the highest value which in FIG. 5 is exemplified as $F_1$ as $R_1>R_2>R_3$. The system 100 is thereafter configured to provide one or more video sequence(s) 700 defined by the selected candidate frame $F_i$. As exemplified in FIG. 5, the system 100 is configured to provide a video sequence defined by candidate frame $F_1$, i.e. a video sequence 110 which has been processed by the system 100 according to the above-mentioned steps. For example, the candidate frame $F_1$ may be displayed on a screen, wherein the upper and lower portions of the screen have been filled (padded) as described in FIG. 4.

Figure 6:
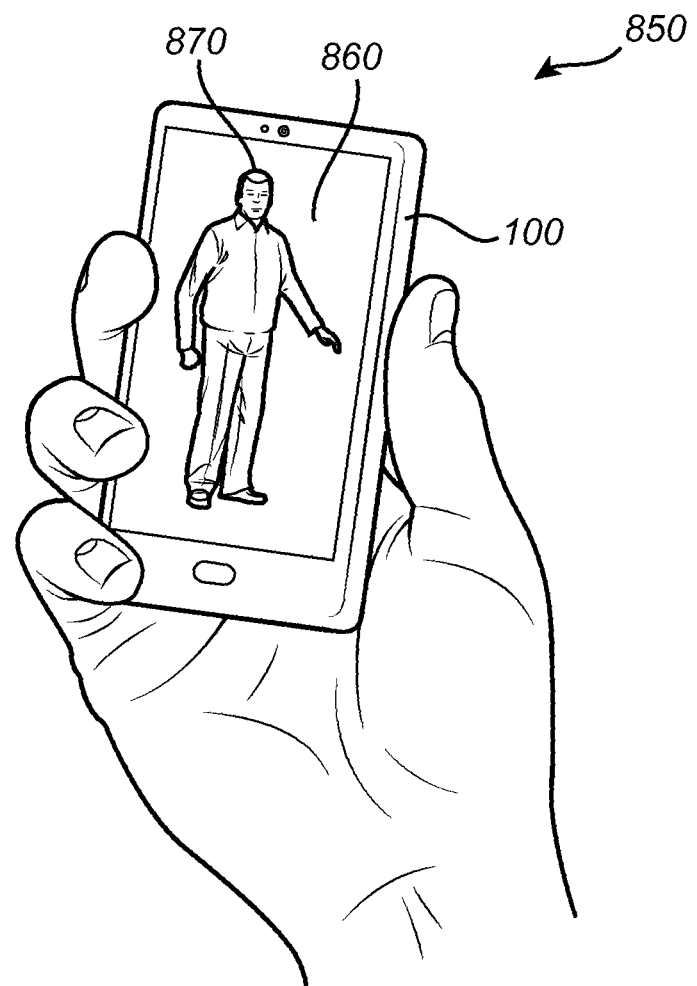
FIG. 6 is a schematic view of a device for video recording, comprising a system according to an exemplifying embodiment of the present invention.

FIG. 6 is a schematic view of a device 850 for video recording. It will be appreciated that the device 850 may be a handheld device, such as a smartphone, or the like. The device 850 comprises a screen 860 and a system 100 according to any one of the preceding embodiments. The device 850 is configured to display, on the screen, at least one video sequence 870 processed by the system 100. It will be appreciated that the system 100 may be configured to process a video sequence 870 which has been provided to the device 850 (e.g. from a server) or a video sequence 870 which has been recorded by the device 850 itself. The device 850 may be configured to record and display the video sequence in real time. The device 850 in FIG. 6 further comprises a touch-sensitive user interface, UI, configured to be used in conjunction with the screen 860. The UI is configured to register at least one marking by a user on the screen of at least one feature on the screen during a display of at least one video sequence on the screen, whereby the UI is provided with user input. The system 100 is further configured to associate the at least one marking with at least one feature $C_i$ of the predetermined set of at least one feature $C_i$, and track the at least one feature. By the term "touch-sensitive user interface", it is here meant a UI which is able to receive an input by a user's touch, such as by one or more fingers of a user touching the UI. The present embodiment is advantageous in that a user, in an easy and convenient manner, may mark, indicate and/or select a feature in the video sequence(s) by touch, e.g. by the use of one or more fingers. Alternatively, the marking by a user of at least one feature may be made as a function of eye-tracking of the user. Alternatively, the marking by a user of at least one feature may be made by speech of the user.

Figure 7:
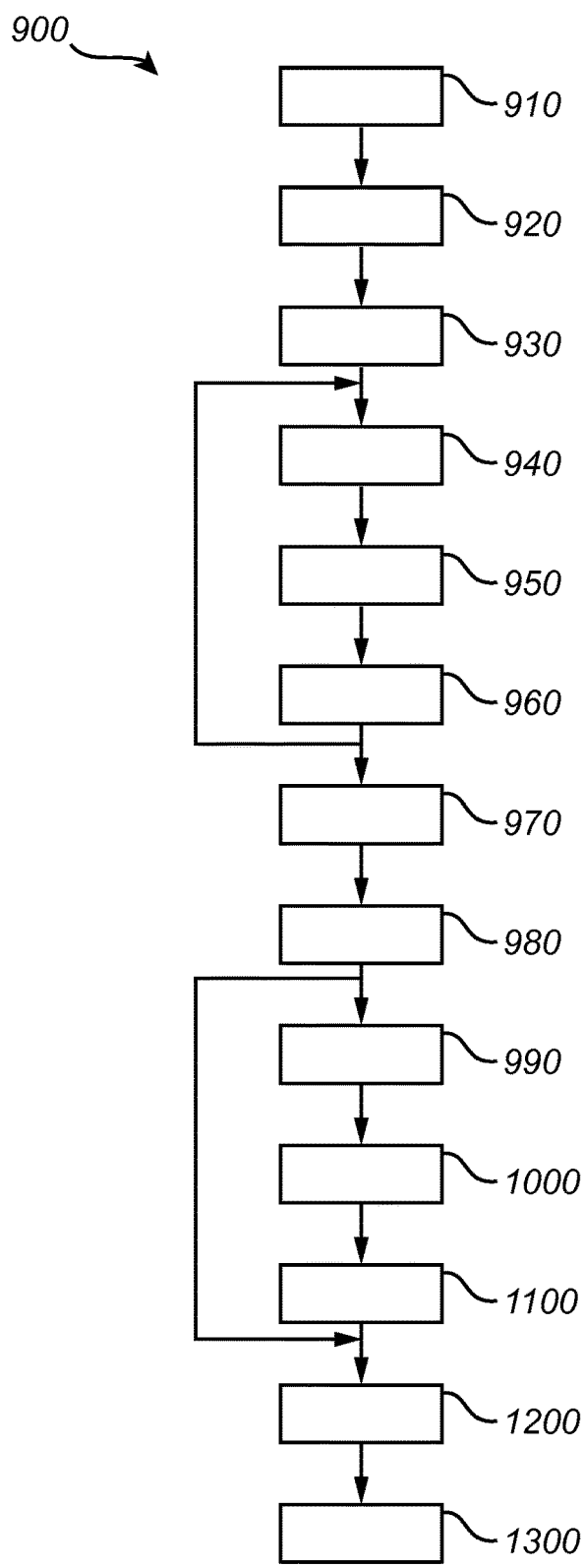
FIG. 7 is a flow chart of the method according to the second aspect of the present invention.

FIG. 7 is a flow chart of the method 900 according to the second aspect of the present invention, wherein at least one video sequence comprises a plurality of time-successive image frames. The method 900 comprises the steps of providing 910 a predetermined set of at least one feature, and associating 920 a weighted value to each feature. The method 900 further comprises the step of providing 930 a predetermined set of at least one imaging process. Then, for at least one image frame of the plurality of time-successive image frames, as indicated by the recursive arrow, the method 900 may perform the following steps: detecting 940, in the image frame, at least one feature from the predetermined set of at least one feature, defining 950 the detected at least one feature by at least one boundary, and providing 960 a frame of weighted density of the image frame, by assigning the weighted value associated with the at least one feature to the area defined by the respective at least one boundary. The method 900 further comprises the steps of superimposing 970 the at least one frame of weighted density into a superimposed set of at least one frame of weighted density, and constructing 980 at least one combination of at least one of the imaging processes of the set of imaging processes. Then, for the at least one combination, as indicated by the recursive arrow, the method 900 may perform the following steps: applying 990 the at least one combination to the superimposed set of at least one frame of weighted density, mapping 1000 the applied at least one combination to a candidate frame, and associating 1100 a value of the candidate frame by evaluating the weighted density of the candidate frame as a function of the applied at least one combination to the superimposed set of at least one frame of weighted density. The method 900 further comprises the steps of selecting 1200 the candidate frame associated with the highest value, and providing 1300 at least one video sequence defined by the selected candidate frame.

The person skilled in the art realizes that the present invention by no means is limited to the preferred embodiments described above. On the contrary, many modifications and variations are possible within the scope of the appended claims. For example, it will be appreciated that the figures are merely schematic views of a system according to embodiments of the present invention. Hence, any dimensions, shapes and/or sizes of images, frames, etc., may be different than those depicted and/or described.

The invention claimed is:

1. A system for processing at least one video sequence, wherein the at least one video sequence comprises a plurality of time-successive image frames, the system being configured to provide a predetermined set of at least one feature, and associate a weighted value to each feature, provide a predetermined set of at least one image processing, and for at least one image frame of the plurality of time-successive image frames, detect, in the image frame, at least one feature from the predetermined set of at least one feature, define the detected at least one feature by at least one boundary, and provide a frame of weighted density of the image frame, by assigning the weighted value associated with the at least one feature to the area defined by the respective at least one boundary, wherein the system is further configured to superimpose the at least one frame of weighted density into a superimposed set of at least one frame of weighted density, construct at least one combination of at least one of the image processing of the set of image processing, and for the at least one combination, being configured to apply the at least one combination to the superimposed set of at least one frame of weighted density, and map the applied at least one combination to a candidate frame, and associate a value of the candidate frame by evaluating the weighted density of the candidate frame as a function of the applied at least one combination to the superimposed set of at least one frame of weighted density, wherein the system is further configured to select the candidate frame associated with the highest value, and provide at least one video sequence defined by the selected candidate frame.

2. The system of claim 1, wherein the feature is selected from a group consisting of an object, a human being, a face of a human being, a color and a text.

3. The system of claim 1, further being configured to associate a weighted value to each feature according to a predetermined set of weighted values.

4. The system of claim 1, further being configured to detect a motion of at least one detected feature based on at least two image frames of the plurality of time-successive image frames, and associate a weighted value to the at least one feature as a function of the motion of the at least one feature.

5. The system of claim 1, wherein the image processing is selected from a group consisting of
adjusting at least one of the height and the width of the video sequence for processing to the respective one of the height and the width of the candidate frame,
providing the union of the video sequence for processing with the candidate frame, and
zooming the video sequence for processing.

6. The system of claim 1, wherein the system is configured to detect, in the image frame, at least one feature from the predetermined set of at least one feature based on pattern recognition.

7. The system of claim 1, for processing at least one video sequence in a first format, wherein the system is further configured to provide at least one video sequence in a second format, defined by the selected candidate frame, and wherein the first format is different from the second format.

8. The system of claim 7, wherein the width of the first format is larger than the height of the first format, and wherein the height of the second format is larger than the width of the second format.

9. A device for video recording, comprising
a screen, and
a system according to claim 1, wherein the device is configured to display, on the screen, at least one video sequence processed by the system.

10. The device of claim 9, further being configured to record at least one video sequence,
provide the at least one video sequence to the system for processing of the at least one video sequence, and
display, on the screen, the at least one video sequence processed by the system.

11. The device of claim 10, further being configured to record and display the at least one video sequence in real time.

12. The device of claim 9, further comprising a storage medium, and wherein the device is further configured to store, on the storage medium,
the at least one video sequence processed by the system, and
the combination of at least one of the image processing of the set of image processing applied to the constructed candidate frame associated with the highest value, defining the at least one video sequence.

13. The device of claim 9, further comprising a user interface, UI, configured to be used in conjunction with the screen, the UI being configured to
register at least one marking by a user of at least one feature on the screen during a display of at least one video sequence on the screen, whereby the UI is provided with user input,
and wherein the system is further configured to
associate the at least one marking with at least one feature of the predetermined set of at least one feature, and
define the at least one feature by at least one boundary.

14. A method for processing at least one video sequence, wherein the at least one video sequence comprises a plurality of time-successive image frames, the method comprising the steps of:
providing a predetermined set of at least one feature, and associating a weighted value to each feature,
providing a predetermined set of at least one imaging process,
and for at least one image frame of the plurality of time-successive image frames,
performing the steps of
detecting, in the image frame, at least one feature from the predetermined set of at least one feature,
defining the detected at least one feature by at least one boundary, and
providing a frame of weighted density of the image frame, by assigning the weighted value associated with the at least one feature to the area defined by the respective at least one boundary,
wherein the method further comprises the steps of
superimposing the at least one frame of weighted density into a superimposed set of at least one frame of weighted density,
constructing at least one combination of at least one of the image processing of the set of image processing, and for the at least one combination, performing the steps of
applying the at least one combination to the superimposed set of at least one frame of weighted density, and mapping the applied at least one combination to a candidate frame, and
associating a value of the candidate frame by evaluating the weighted density of the candidate frame as a function of the applied at least one combination to the superimposed set of at least one frame of weighted density,
wherein the method further comprises the steps of
selecting the candidate frame associated with the highest value, and
providing at least one video sequence defined by the selected candidate frame.

15. A computer program comprising computer readable code for causing a computer to carry out the steps of the method according to claim 14 when the computer program is carried out on the computer.

* * * * *